(12) United States Patent
Dalton et al.

(10) Patent No.: US 11,619,077 B2
(45) Date of Patent: Apr. 4, 2023

(54) VEHICULAR STORAGE BOX

(71) Applicant: Ford Global Technologies, LLC, Dearborn, MI (US)

(72) Inventors: Brent Clifford Dalton, Dearborn, MI (US); Steven Nicholas Fidh, Ann Arbor, MI (US); Frank Qiukui Liu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 16/925,916

(22) Filed: Jul. 10, 2020

(65) Prior Publication Data
US 2022/0010599 A1  Jan. 13, 2022

(51) Int. Cl.
*E05B 81/16* (2014.01)
*E05B 81/08* (2014.01)
(Continued)

(52) U.S. Cl.
CPC .............. *E05B 81/16* (2013.01); *B60R 7/06* (2013.01); *E05B 81/08* (2013.01); *E05B 83/30* (2013.01);
(Continued)

(58) Field of Classification Search
CPC .......... E05B 81/00; E05B 81/01; E05B 81/02; E05B 81/04; E05B 81/05; E05B 81/06; E05B 81/08; E05B 81/16; E05B 81/54; E05B 83/00; E05B 83/28; E05B 83/30; B60R 7/00; B60R 7/04; B60R 7/06; E05Y 2201/40; E05Y 2201/42; E05Y 2201/46; E05Y 2201/462; E05Y 2201/47; E05Y 2201/474; E05Y 2201/476; E05Y 2201/478; E05Y 2201/48; E05Y 2201/482;
(Continued)

(56) References Cited

U.S. PATENT DOCUMENTS

| 5,484,092 A | 1/1996 | Cheney |
| 2008/0007081 A1* | 1/2008 | Shibata ............... E05B 47/0009 70/158 |

(Continued)

FOREIGN PATENT DOCUMENTS

| DE | 102006012956 A1 | 3/2007 |
| DE | 202015100165 U1 | 1/2015 |

(Continued)

*Primary Examiner* — Nathan Cumar
(74) *Attorney, Agent, or Firm* — Vichit Chea; Price Heneveld LLP

(57) ABSTRACT

A vehicular storage box that includes a compartment for holding articles, the compartment comprising four sides, a bottom and a top lid. The compartment is fabricated from an engineered plastic or a polymer matrix composite. The box further includes a locking assembly situated within the lid. The locking assembly comprises a central locking wheel connected to a linkage, a plurality of pawls for each of at least three of the sides of the compartment, and a solenoid switch. The locking wheel is movably connected to the plurality of pawls. Further, the solenoid switch is connected to the linkage to move the wheel to drive the plurality of pawls into and out of the at least three of the sides of the compartment into a respective locked position of the lid and an unlocked position of the lid.

20 Claims, 6 Drawing Sheets

(51) Int. Cl.
   E05B 83/30     (2014.01)
   B60R 7/06      (2006.01)
(52) U.S. Cl.
   CPC ....... *E05Y 2201/42* (2013.01); *E05Y 2201/47* (2013.01); *E05Y 2201/686* (2013.01); *E05Y 2201/708* (2013.01); *E05Y 2400/66* (2013.01); *E05Y 2400/82* (2013.01); *E05Y 2400/86* (2013.01); *E05Y 2800/68* (2013.01); *E05Y 2900/538* (2013.01)
(58) Field of Classification Search
   CPC ......... E05Y 2201/484; E05Y 2201/488; E05Y 2201/64; E05Y 2201/686; E05Y 2201/708; E05Y 2400/00; E05Y 2400/662; E05Y 2400/664; E05Y 2400/82; E05Y 2400/822; E05Y 2400/86; E05Y 2800/00; E05Y 2800/68; E05Y 2900/00; E05Y 2900/538; E05Y 2900/54

USPC .......................................................... 292/21
See application file for complete search history.

(56) References Cited

U.S. PATENT DOCUMENTS

| | | | |
|---|---|---|---|
| 2015/0191943 A1* | 7/2015 | Tieman | ................... E05B 85/26 292/195 |
| 2015/0203046 A1* | 7/2015 | Nedelman | ................. B60R 7/02 296/37.7 |
| 2016/0229325 A1* | 8/2016 | Parlow | ..................... B60R 7/04 |
| 2019/0128027 A1* | 5/2019 | Schroll | ................... E05B 81/90 |

FOREIGN PATENT DOCUMENTS

DE    202016100301 U1    4/2016
JP         2000213220 A    8/2000

* cited by examiner

VEHICULAR STORAGE BOX

FIELD OF THE DISCLOSURE

The present disclosure generally relates to lockable storage boxes, compartments, safes and containers and, more particularly, to vehicular, lockable storage boxes, compartments, safes and containers fabricated from high-strength materials, such as polymer matrix composites and engineered plastics.

BACKGROUND OF THE DISCLOSURE

Owners and occupants of vehicles often require secured storage inside of their vehicles. Conventional options, such as glove boxes and console bins, have limited security and storage space. From a security standpoint, glove boxes and console bins are made of relatively low strength materials and have accessible features (e.g., latches) that are easy for an unauthorized individual to defeat with simple tools. Further, glove boxes and console bins have limited storage space for valuable items. Aftermarket vehicular storage boxes are another option with greater storage space and security, but are often heavy, which can reduce vehicle fuel efficiency, and are high in cost.

SUMMARY OF THE DISCLOSURE

According to a first aspect of the present disclosure, a vehicular storage box is provided that includes a compartment for holding articles, the compartment comprising four sides, a bottom and a top lid. The compartment is fabricated from an engineered plastic or a polymer matrix composite. The box further includes a locking assembly situated within the lid. The locking assembly comprises a central locking wheel connected to a linkage, a plurality of pawls for each of at least three of the sides of the compartment, and a solenoid switch. The locking wheel is movably connected to the plurality of pawls. Further, the solenoid switch is connected to the linkage to move the wheel to drive the plurality of pawls into and out of the at least three of the sides of the compartment into a respective locked position of the lid and an unlocked position of the lid.

Embodiments of the first aspect of the disclosure can include any one or a combination of the following features:
  a plurality of sliders, each slider connected to a set of a plurality of pawls corresponding to each of the at least three sides of the compartment, wherein the locking wheel comprises a plurality of kidney-shaped tracks, each track receiving one of the sliders;
  each pawl is engaged to a depth of at least 5 mm in one of the at least three sides of the compartment in the locked position of the lid;
  the plurality of pawls has a pawl spacing of no more than 5 cm;
  the linkage further comprises a spring to bias the wheel and the plurality of pawls in the locked position of the lid and the unlocked position of the lid; and
  the compartment is fabricated from a polymer matrix composite comprising a glass-filled polymer composite or a carbon-filled polymer composite.

According to a second aspect of the present disclosure, a vehicular storage box is provided that includes a compartment for holding articles, the compartment comprising four sides, a bottom and a top lid. The compartment is fabricated from an engineered plastic or a polymer matrix composite. The box further includes a locking assembly situated within the lid, and a wireless interface. The locking assembly comprises a central locking wheel connected to a linkage, a plurality of pawls for each of at least three of the sides of the compartment, and a solenoid switch. The locking wheel is movably connected to the plurality of pawls. Further, the solenoid switch is connected to the linkage to move the wheel to drive the plurality of pawls into and out of the at least three of the sides of the compartment into a respective locked position of the lid and an unlocked position of the lid. In addition, the wireless interface is configured to receive a wireless input and activate the solenoid switch based on the wireless input.

Embodiments of the second aspect of the disclosure can include any one or a combination of the following features:
  a plurality of sliders, each slider connected to a set of a plurality of pawls corresponding to each of the at least three sides of the compartment, wherein the locking wheel comprises a plurality of kidney-shaped tracks, each track receiving one of the sliders;
  each pawl is engaged to a depth of at least 5 mm in one of the at least three sides of the compartment in the locked position of the lid;
  the plurality of pawls have a pawl spacing of no more than 5 cm;
  the linkage further comprises a spring to bias the wheel and the plurality of pawls in the locked position of the lid and the unlocked position of the lid;
  the compartment is fabricated from a polymer matrix composite comprising a glass-filled polymer composite or a carbon-filled polymer composite; and
  the wireless input is based at least in part on an entry in a sensing interface of a personal identification number (PIN), a haptic security input, or another security code.

According to a third aspect of the present disclosure, a vehicular storage box is provided that includes a compartment for holding articles, the compartment comprising four sides, a bottom and a top lid. The compartment is fabricated from an engineered plastic or a polymer matrix composite. The box further includes a locking assembly situated within the lid, and a mechanical interface. The locking assembly comprises a central locking wheel connected to a linkage, a plurality of pawls for each of at least three of the sides of the compartment, and a solenoid switch. The locking wheel is movably connected to the plurality of pawls. Further, the solenoid switch is connected to the linkage to move the wheel to drive the plurality of pawls into and out of the at least three of the sides of the compartment into a respective locked position of the lid and an unlocked position of the lid. In addition, the mechanical interface is configured to receive a mechanical input and activate the solenoid switch based on the mechanical input.

Embodiments of the third aspect of the disclosure can include any one or a combination of the following features:
  a plurality of sliders, each slider connected to a set of a plurality of pawls corresponding to each of the at least three sides of the compartment, wherein the locking wheel comprises a plurality of kidney-shaped tracks, each track receiving one of the sliders;
  each pawl is engaged to a depth of at least 5 mm in one of the at least three sides of the compartment in the locked position of the lid;
  the plurality of pawls have a pawl spacing of no more than 5 cm;
  the linkage further comprises a spring to bias the wheel and the plurality of pawls in the locked position of the lid and the unlocked position of the lid;

the compartment is fabricated from a polymer matrix composite comprising a glass-filled polymer composite or a carbon-filled polymer composite; and the mechanical input is based at least in part on movement of a key in a lock, movement of tumblers in a lock, or a haptic communication with a sensing interface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1A:
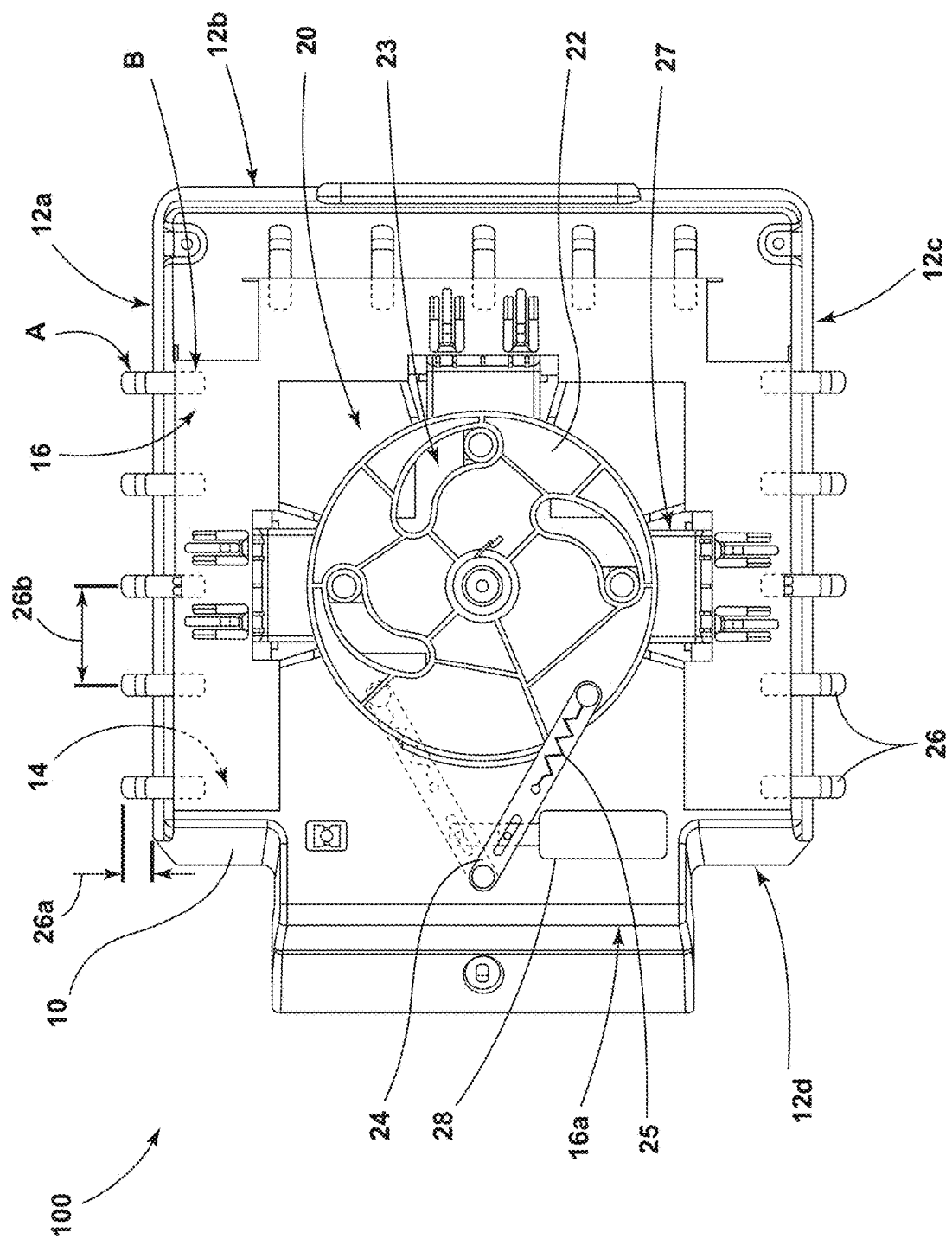
FIG. 1A is a top-down, cut-away view of a vehicular storage box, according to an embodiment of the disclosure.
Figure 1B:
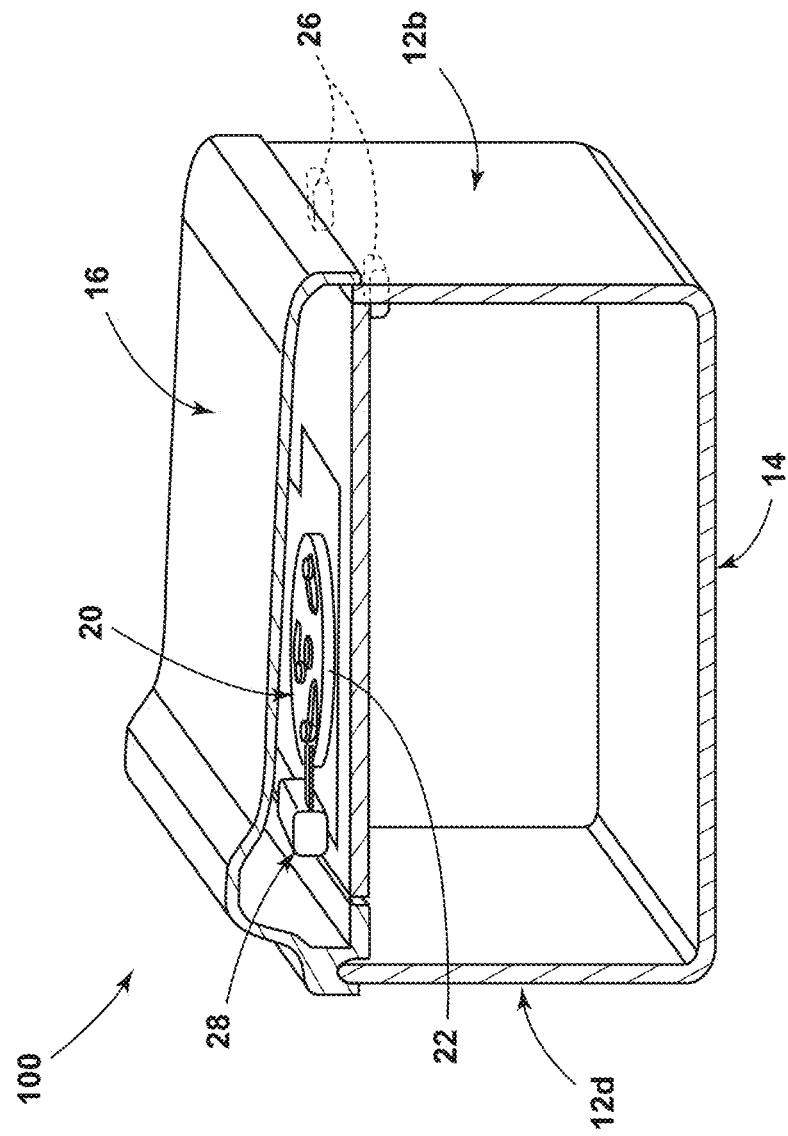
FIG. 1B is a side, perspective view of the vehicular storage box depicted in FIG. 1A.

For purposes of description herein, the terms "upper," "lower," "right," "left," "rear," "front," "vertical," "horizontal," and derivatives thereof shall relate to the concepts as oriented in FIGS. 1A and 1B. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicular storage box. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1A and 1B, a vehicular storage box 100 is provided that includes a compartment 10 for holding articles, the compartment 10 includes four sides 12a, 12b, 12c, 12d, a bottom 14 and a top lid 16. The compartment 10 is lockable and may be any sized compartment, container, box, safe or the like, suitable for use in a vehicle. In some embodiments, the compartment 10 takes on a substantially cubic shape with the sides 12a, 12b, 12c, 12d, bottom 14 and top lid 16 having substantially similar dimensions. In other embodiments, the compartment 10 takes on a non-cubic shape, with one or more circular, rectangular, triangular or elliptical faces, and some or all of the sides 12a, 12b, 12c, 12d, bottom 14 and top lid 16 having dissimilar dimensions. As shown in FIGS. 1A and 1B, the bottom 14 of the compartment 10 is connected to the sides 12a, 12b, 12c, 12d, without a seam or fastener in some embodiments. In other embodiments, the bottom 14 can be connected to the sides 12a, 12b, 12c, 12d with fasteners, typically of a higher strength than the engineered plastic or polymer matrix composite employed for the compartment 10. Further, the top lid 16 may be coupled to the sides 12a, 12b, 12c, 12d by a hinge 16a, as shown in FIGS. 1A and 1B. The hinge 16a may be of any conventional construction suitable for allowing the top lid 16 to open and close relative to the sides 12a, 12b, 12c, 12d of the compartment 10.

Referring again to FIGS. 1A and 1B, the vehicular storage box 100 includes a compartment 10 that is fabricated from an engineered plastic or a polymer matrix composite. Suitable engineered plastics include acrylonitrile butadiene styrene (ABS), polycarbonate, polyamide, nylon, polyetheretherketone (PEEK), polyethylene terephthalate (PET), polyimide, polyoxymethylene plastic (POM), polyphenylene sulfide (PPS), polyphenylene oxide (PPO), polysulphone (PSU) and polytetrafluoroethylene (PTFE). Suitable polymer matrix composites include glass particle-filled polymer, glass fiber-filled polymer, carbon particle-filled polymer, carbon fiber-filled polymer, fiberglass-filled polymer, aramid fiber-filled polymer, and graphite fiber-filled polymer composites. In these embodiments, the polymer matrix can be any of a variety of thermoplastic and thermoset resins and polymers.

The vehicular storage box 100 depicted in FIGS. 1A and 1B also includes a locking assembly 20 situated within the top lid 16, e.g., in a manner not visible from outside of the box 100. The locking assembly 20 includes a central locking wheel 22 connected to a linkage 24. In some embodiments, the central locking wheel 22 is circular or elliptical in shape. The locking assembly 20 also includes a plurality of pawls 26 for each of at least three sides 12a, 12b, 12c, 12d of the compartment 10. In some embodiments, a plurality of pawls 26 corresponds to each of sides 12a, 12b, 12c, as shown in FIGS. 1A and 1B. In other embodiments, a plurality of pawls 26 corresponds to each of the four sides 12a, 12b, 12c, 12d (see FIG. 3 and corresponding description below). In further implementations, the plurality of pawls 26 corresponds to any one or two of sides 12a, 12b, 12c, 12d of the compartment 10. In addition, the locking assembly 20 includes one or more solenoid switches 28. Each of the solenoid switches 28 employed in the locking assembly 20 may be a conventional solenoid switch that is capable of converting electrical energy into motion.

Referring again to the vehicular storage box 100 shown in FIGS. 1A and 1B, the locking wheel 22 of the locking assembly 20 is movably connected or otherwise coupled to the plurality of pawls 26. As such, movement of the locking wheel 22 can move the plurality of pawls 26, e.g., in a direction normal to its corresponding side 12a, 12b, 12c or 12d. For example, movement of the locking wheel 22 can move the pawls 26 into a locked position, A, or an unlocked position, B, as shown in FIG. 1A. The locking wheel 22 can be movably connected or coupled to the pawls 26 by any of a variety of connections, hinges, tracks, racers, suitable for the stated function.

Still referring to the vehicular storage box 100 shown in FIGS. 1A and 1B, each of the solenoid switches 28 can be connected to the linkage 24 to move the locking wheel 22 based on electrical energy directed to each of the solenoid switches 28 (not shown). As such, movement of the linkage 24, as actuated by each of the solenoid switches 28, can move the locking wheel 22 to drive the plurality of pawls 26 into and out of the corresponding sides 12a, 12b, 12c, 12d of the compartment 10 into a respective locked position A of the top lid 16 and an unlocked position B of the top lid 16. Put another way, the one or more solenoid switches 28 employed in the locking assembly 20 can be actuated to lock or unlock the top lid 16 of the compartment 10 of the vehicular storage box 100.

Referring again to locking assembly 20 depicted in FIGS. 1A and 1B, each of the pawls 26 can be dimensioned and sized in a manner sufficient to allow for locking of the top lid 16 to the sides 12a, 12b, 12c, 12d of the compartment 10. In embodiments of the vehicular storage box 100, the pawls 26 are made of a high strength material, e.g., carbon steel, stainless steel, chrome alloy steel, etc., suitable to lock the lid 16 to the compartment 10 without failure from unauthorized tampering with a pry bar, crow bar, etc. In some embodiments of the vehicular storage box 100, each pawl 26 is engaged to a depth 26a of at least 2.5 mm, 5 mm, or 7.5 mm in one or more of the sides 12a, 12b, 12c, 12d in the locked position A of the top lid 16. For example, each pawl 26 may be engaged to a depth 26a of 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, or other depths between the foregoing values. In embodiments, the engagement of the pawls 26 to a depth 26a, e.g., at least 2.5 mm, 5 mm, or 7.5 mm, ensures that locked position A of the top lid 16 is sufficient to provide security of the compartment 10 of the vehicular storage box 100 against tampering and unauthorized access at a level that exceeds those of conventional vehicular storage boxes.

According to some embodiments of the vehicular storage box 100 depicted in FIGS. 1A and 1B, the plurality of pawls 26 have a pawl spacing 26b of no more than 1 mm, 2.5 mm, or 5 mm, in one or more of the sides 12a, 12b, 12c, 12d. For example, the plurality of pawls 26 may have a pawl spacing 26b of no more than 0.5 mm, 1 mm, 1.5 mm, 2 mm, 2.5 mm, 3 mm, 3.5 mm, 4 mm, 4.5 mm, 5 mm, or other spacing levels between the foregoing values. In embodiments, the configuration of the pawls 26 at a spacing 26b, e.g., of no more than 1 mm, 2.5 mm, or 5 mm, ensures that locked position A of the top lid 16 is sufficient to provide security of the compartment 10 of the vehicular storage box 100 against tampering and unauthorized access at a level that exceeds those of conventional vehicular storage boxes. In particular, the relatively small spacing 26b between the pawls 26 can prevent an individual from fitting a shim, pry bar, crow bar, or the like between the pawls 26 and increasing leverage to pry open the top lid 16 from the compartment 10.

Still referring to the vehicular storage box 100 depicted in FIGS. 1A and 1B, the box 100, according to some embodiments, can further include a plurality of sliders 27, with each slider 27 connected or otherwise coupled to a set of the plurality of pawls 26 that corresponds to one of the sides 12a, 12b, 12c, 12d of the compartment 10. In these embodiments, the locking wheel 22 can include a plurality of kidney-shaped tracks 23, with each track 23 receiving one of the sliders 27. As such, movement of the locking wheel 22, e.g., by the solenoid switch 28 (or switches 28) and linkage 24, results in movement of the kidney-shaped tracks 23 which, in turn, moves the sliders 27 and plurality of pawls 26 into and out of the locked position A or unlocked position B. In embodiments, the kidney-shaped tracks 23 are configured to prevent any torque from being applied to the locking wheel 22 by the sliders 27, e.g., from unauthorized tampering. In addition, the kidney-shaped tracks 23 can beneficially allow for actuation and movement of the sliders 27 with an interface between the sliders 27 and the track 23 that exceeds 45 degrees, thus distributing forces between the sliders 27 and the wheel 22 to improve reliability.

Referring once again to the vehicular storage box 100 depicted in FIGS. 1A and 1B, the box 100, according to some implementations, may include a linkage 24 that further includes a spring 25 to bias the locking wheel 22 and the plurality of pawls 26 in the locked position A and the unlocked position B of the top lid 16 relative to the compartment 10. That is, the spring 25 can work in conjunction with each of the solenoid switches 28, linkage 24, locking wheel 22 and plurality of sliders 27 (if present) and can bias the plurality of pawls 26 into one of a locked position A or unlocked position B of the lid 16 rather than any intermediate positions. Advantageously, in these embodiments, the spring 25 can serve to ensure that the locking assembly 20 is always in a loaded configuration, thus minimizing or eliminating any rattle between the pawls 26 and the sides 12*a*, 12*b*, 12*c*, 12*d*, for example.

Figure 1C:
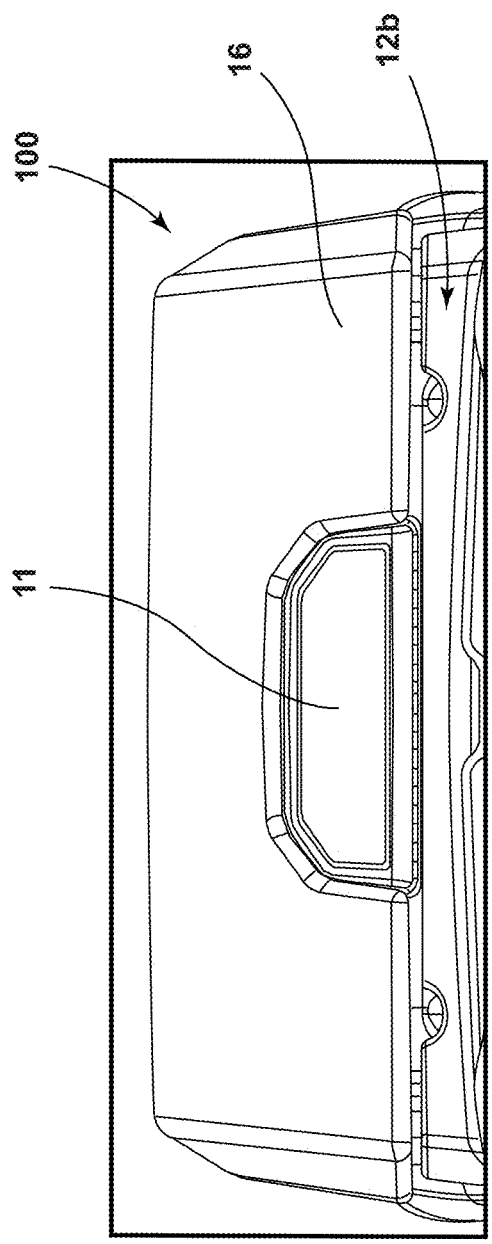
FIG. 1C is a front, perspective view of a portion of the vehicular storage box depicted in FIG. 1A.

Referring now to FIG. 1C, the vehicular storage box 100 depicted in FIGS. 1A and 1B is shown in an enlarged, perspective front view highlighting the top lid 16 and side 12*b* of the compartment 10. As shown, this embodiment of the vehicular storage box 100 has a top lid 16 with a handle 11, which can be used to open the top lid 16, provided that the plurality of pawls 26 (see FIGS. 1A and 1B) are in an unlocked position B. In embodiments, the handle 11 can be used to open the top lid 16 by virtue of the hinge 16*a* (shown in FIGS. 1A and 1B) with regard to the compartment 10.

Figure 2A:
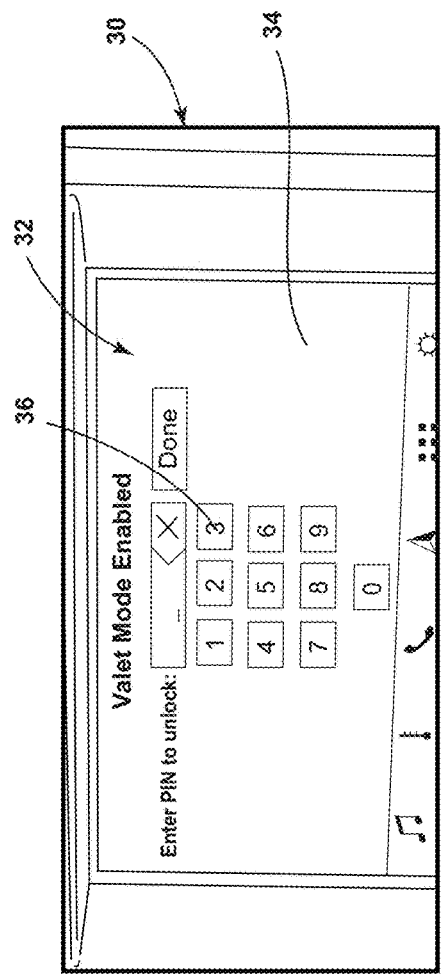
FIG. 2A is a front view of a wireless interface for a vehicular storage box, particularly a wireless input that is based at least in part on an entry in a sensing interface in the form of an entry of a personal identification number (PIN), according to an embodiment of the disclosure.

According to an embodiment of the vehicular storage box 100 depicted in FIGS. 1A, 1B and 2A, the storage box 100 can include a compartment 10 for holding articles, the compartment comprising four sides, 12*a*, 12*b*, 12*c*, 12*d*, a bottom 14 and a top lid 16. The compartment 10 is fabricated from an engineered plastic or a polymer matrix composite. The box 100 further includes a locking assembly 20 situated within the lid 16; and a wireless interface 30 (see FIG. 2A). The locking assembly 20 comprises a central locking wheel 22 connected to a linkage 24, a plurality of pawls 26 for each of at least three of the sides 12*a*, 12*b*, 12*c*, 12*d* of the compartment 10, and a solenoid switch 28. The locking wheel 22 is movably connected to the plurality of pawls 26. Further, the solenoid switch 28 is connected to the linkage 24 to move the wheel 22 to drive the plurality of pawls 26 into and out of the at least three of the sides 12*a*, 12*b*, 12*c*, 12*d* of the compartment 10 into a respective locked position A of the lid 16 and an unlocked position B of the lid 16. In addition, the wireless interface 30 depicted in FIG. 2A is configured to receive a wireless input 32 and activate the solenoid switch 28 based on the wireless input 32.

According to some embodiments of the wireless interface 30 depicted in FIG. 2A of a vehicular storage box 100 (see FIGS. 1A and 1B), the wireless input 32 can be based at least in part on an entry in a sensing interface 34 of a personal identification number (PIN) 36, a haptic security input (not shown) or another security code (not shown) For example, a user can enter a PIN 36 into the sensing interface 34 (e.g., as a touchscreen or an array of buttons), which provides a wireless input 32 to the wireless interface 30 to activate the one or more solenoid switches 28 of the vehicular storage box 100 (see FIGS. 1A and 1B). As such, one can enter the PIN 36 to activate the solenoid switch 28 to move the plurality of pawls 26 from a locked position A into an unlocked position B of the top lid 16, or vice versa. In those embodiments employing a haptic security input (e.g., a thumbprint or fingerprint) for the sensing interface 34, the haptic security input can be in the form of a conventional touchscreen panel, e.g., on a center display within a vehicular dashboard. An advantage of these embodiments is that one can unlock or lock the top lid 16 of the compartment 10 by using a wireless interface 30 that does not rely on any visible components of the storage box 100, thus enhancing the security of the arrangement. In some of these implementations, the wireless interface 30 is hidden from view, and the vehicular storage box 100 therefore does not possess any obvious mechanical barrel or latching system that could be tampered with by an unauthorized individual.

Figure 2B:
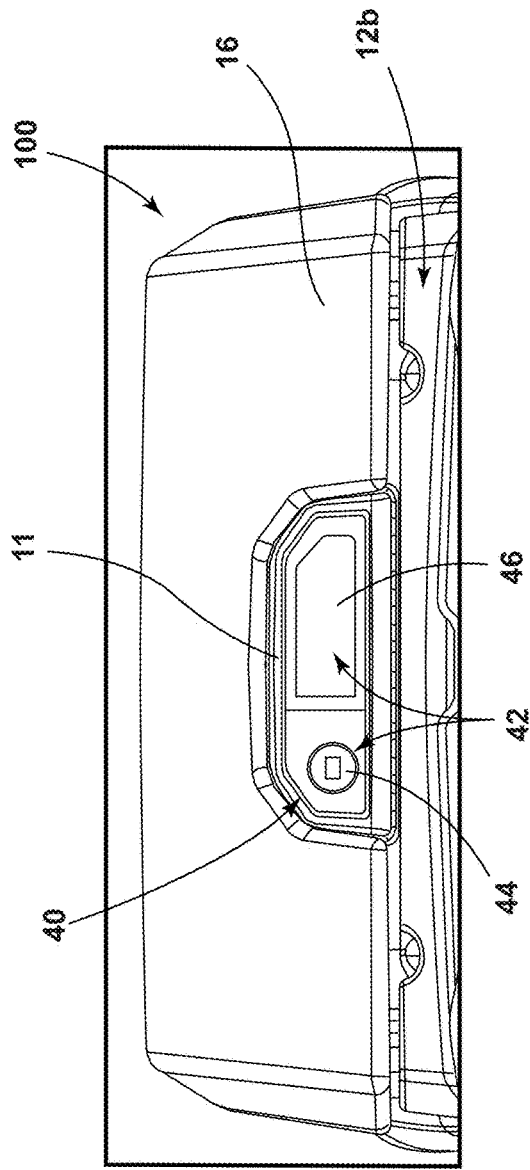
FIG. 2B is a front view of a mechanical interface for a vehicular storage box, particularly a mechanical input that is based at least in part on movement of a key in a lock and/or a haptic communication with a sensing interface, according to an embodiment of the disclosure.

According to another embodiment of the vehicular storage box 100 depicted in FIGS. 1A, 1B and 2B, the storage box 100 can include a compartment 10 for holding articles, the compartment comprising four sides, 12*a*, 12*b*, 12*c*, 12*d*, a bottom 14 and a top lid 16. The compartment 10 is fabricated from an engineered plastic or a polymer matrix composite. The box 100 further includes a locking assembly 20 situated within the lid 16; and a mechanical interface 40 (see FIG. 2B). The locking assembly 20 comprises a central locking wheel 22 connected to a linkage 24, a plurality of pawls 26 for each of at least three of the sides 12*a*, 12*b*, 12*c*, 12*d* of the compartment 10, and a solenoid switch 28. The locking wheel 22 is movably connected to the plurality of pawls 26. Further, the solenoid switch 28 is connected to the linkage 24 to move the wheel 22 to drive the plurality of pawls 26 into and out of the at least three of the sides 12*a*, 12*b*, 12*c*, 12*d* of the compartment 10 into a respective locked position A of the lid 16 and an unlocked position B of the lid 16. In addition, the mechanical interface 40 depicted in FIG. 2B is configured to receive a mechanical input 42 and activate the solenoid switch 28 based on the mechanical input 42.

According to some embodiments of the mechanical interface 40 depicted in FIG. 2B of a vehicular storage box 100 (see FIGS. 1A and 1B), the mechanical input 42 can be based at least in part on movement of a key in a lock 44, movement of tumblers in a lock (not shown), or a haptic communication with a sensing interface 46. For example, the mechanical input 42 can be movement of a key (not shown) within a lock 44 to either of two positions that correspond to the movement of the plurality of pawls 26 into a locked position A or an unlocked position B of the top lid 16 through activation of each of the solenoid switches 28 (see FIGS. 1A and 1B). As another example, the mechanical input 42 shown in FIG. 2B can be the action of one's finger against a sensing interface 46 (e.g., a touchscreen) to activate each of the solenoid switches 28 to move the plurality of pawls 26 into a locked position A or an unlocked position B of the top lid 16. Similarly, one can move tumblers in a lock (not shown) to accomplish these functions.

Figure 3:
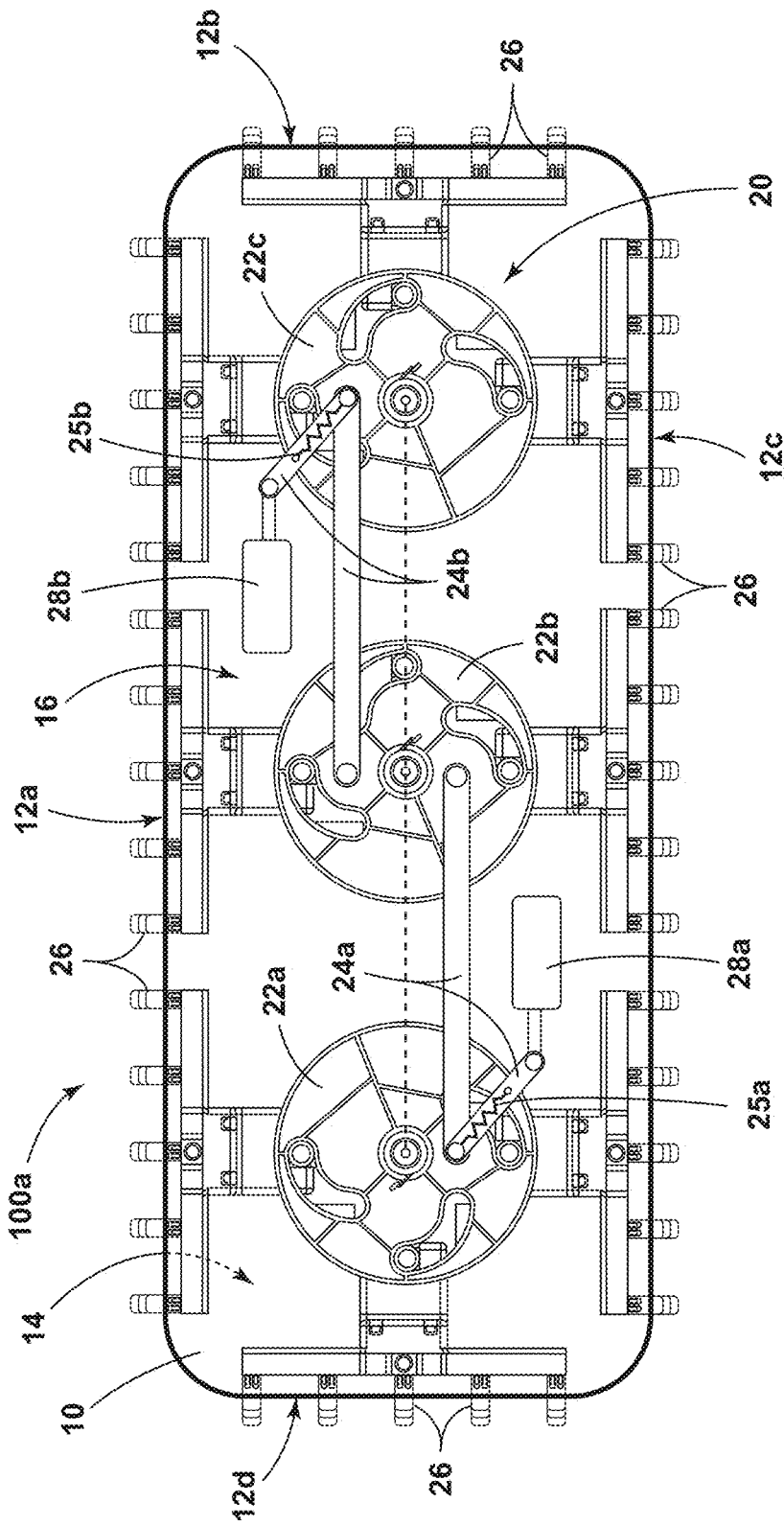
FIG. 3 is a top-down, cut-away view of a vehicular storage box with a locking assembly comprising a plurality of locking wheels and linkages, according to an embodiment of the disclosure.

Referring now to FIG. 3, a top-down, cut-away view of a vehicular storage box 100*a* is depicted with a locking assembly 20 that includes a plurality of locking wheels 22*a*, 22*b*, 22*c*, linkages 24*a*, 24*b*, springs 25*a*, 25*b*, and solenoid switches 28*a*, 28*b*. Unless otherwise noted, the vehicular storage box 100*a* is substantially similar to the vehicular storage box 100 depicted in FIGS. 1A and 1B, with likenumbered elements having substantially the same function and structure. In addition, the solenoid switches 28a and 28b can work in tandem with the same input (e.g., as via a wireless interface 30 or mechanical interface 40, as shown in FIGS. 2A and 2B) to actuate linkages 24a and 24b, along with the springs 25a, 25b, to move wheels 22a, 22b and 22c in a coordinated fashion to drive the plurality of pawls 26 into and out of the locked and unlocked positions A and B with regard to sides 12a, 12b, 12c, 12d (see FIGS. 1A and 1B). Notably, the vehicular storage box 100a can be configured with a locking assembly 20 that includes a plurality of locking wheels 22a, 22b, 22c, linkages 24a, 24b, springs 25a, 25b, and solenoid switches 28a, 28b to work with a compartment 10 having a length dimension that exceeds its width dimension. As such, embodiments of the vehicular storage box 100a are configured with any number of locking wheels 22a, 22b, 22c, etc., linkages 24a, 24b, etc., springs 25a, 25b, etc., and solenoid switches 28a, 28b, etc., based on the dimensions of the compartment 10, particularly the ratio of its length to width.

Figure 4B:
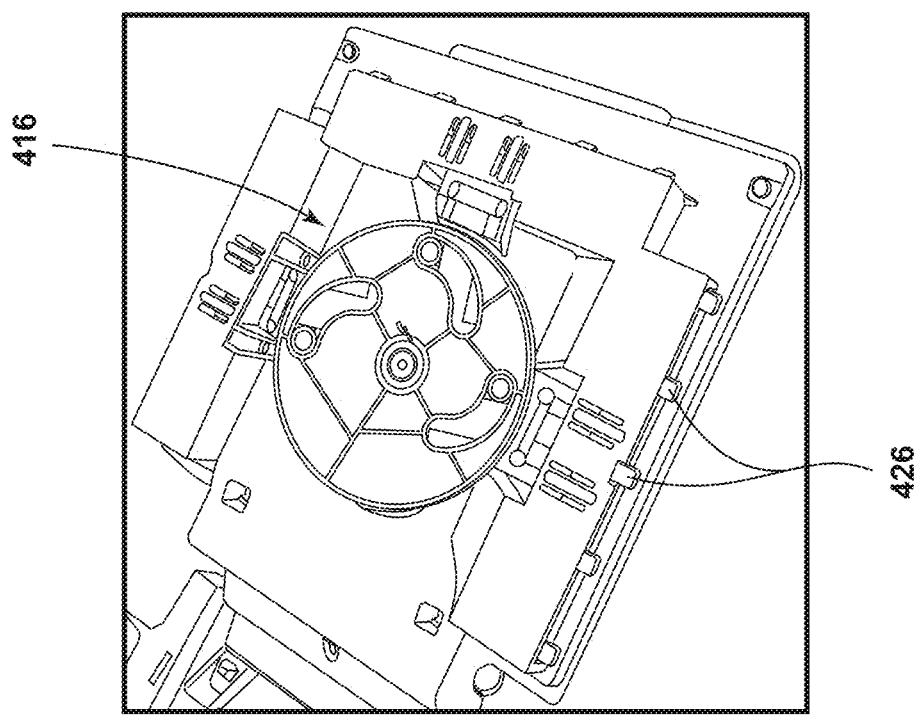
FIGS. 4A and 4B are photographs of a prototype vehicular storage box, according to an embodiment of the disclosure.
Figure 4A:
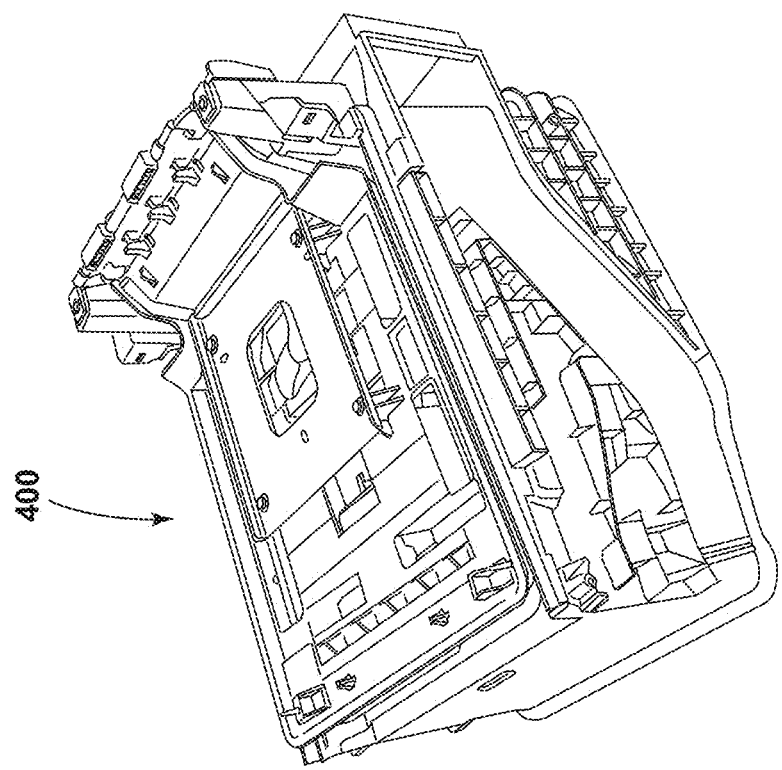

Referring now to FIGS. 4A and 4B, a vehicular storage box 400 is provided as a prototype, according to an embodiment of the disclosure. As is evident from these figures, the storage box 400 includes a top lid 416 and a plurality of pawls 426, and is generally constructed in a manner consistent with the vehicular storage box 100, as described and shown earlier in FIGS. 1A and 1B. As can be observed from these figures, the vehicular storage box 400 can take on any of a variety of shapes and constructions suitable for use in a vehicle, e.g., under a passenger seat, in the trunk of the vehicle, the console of the vehicle between the seats, etc.

The vehicular storage box 100 shown and described in the various embodiments is beneficial in terms of its security and storage capability. Unlike conventional glove boxes and console bins, the vehicular storage box 100 of this disclosure is made of high-strength materials, such as engineered plastics or polymer matrix composites, and does not have any readily-accessible features available for tampering (e.g., latches). Further, the vehicular storage box 100 can take on any of a variety of shapes and sizes for increased storage relative to conventional glove boxes and console bins. Further, unlike aftermarket vehicular storage boxes, the vehicular storage box 100 of this disclosure is relatively low in weight as it principally employs non-metal components, which can translate to better fuel efficiency. Ultimately, the vehicular storage box 100 of this disclosure can be employed as a lockable storage box, compartment, safe or container within a vehicle, and situated in any of a variety of vehicular locations (e.g., in a trunk, center console, under a seat, etc.).

Accordingly, it should be appreciated that the vehicular storage box 100 of the disclosure may be employed onboard a vehicle. However, it should also be appreciated that the vehicular storage box 100 may be employed in various other applications (e.g., on a boat, in a residence, etc.), according to other embodiments. Moreover, it should be understood that embodiments of the vehicular storage box 100 outlined in exemplary form in this disclosure may be combined or modified, as would be understood by those of ordinary skill in the field of the disclosure. For example, a vehicular storage box 100, as shown in FIGS. 1A and 1B, can employ a combination of the features of the wireless interface 30 (see FIG. 2A) and mechanical interface 40 (see FIG. 2B) outlined in the disclosure. In such configurations, the mechanical interface 40 can act as a backup for one to access the contents of the vehicular storage box 100 if the wireless interface 30 does not function (e.g., based on a blown fuse).

It is to be understood that variations and modifications can be made on the aforementioned vehicular storage box 100 without departing from the concepts of the present disclosure, and further it is to be understood that such concepts are intended to be covered by the following claims unless these claims by their language expressly state otherwise.

What is claimed is:

1. A vehicular storage box, comprising:
   a compartment for holding articles, the compartment comprising four sides, a bottom and a top lid, wherein the compartment is fabricated from an engineered plastic or a polymer matrix composite; and
   a locking assembly situated within the top lid,
   wherein the locking assembly comprises a central locking wheel connected to a linkage, a plurality of pawls for each of at least three of the sides of the compartment, and a solenoid switch,
   wherein the central locking wheel is movably connected to the plurality of pawls, and
   further wherein the solenoid switch is connected to the linkage to move the central locking wheel to drive the plurality of pawls into and out of the at least three of the sides of the compartment into a respective locked position of the top lid and an unlocked position of the top lid.

2. The storage box according to claim 1, further comprising:
   a plurality of sliders, each slider connected to a set of the plurality of pawls corresponding to each of the at least three sides of the compartment,
   wherein the locking wheel comprises a plurality of kidney-shaped tracks, each track receiving one of the sliders.

3. The storage box according to claim 1, wherein each pawl is engaged to a depth of at least 5 mm in one of the at least three of the sides of the compartment in the locked position of the lid.

4. The storage box according to claim 1, wherein the plurality of pawls have a pawl spacing of no more than 5 cm.

5. The storage box according to claim 1, wherein the linkage further comprises a spring to bias the wheel and the plurality of pawls in the locked position of the lid and the unlocked position of the lid.

6. The storage box according to claim 1, wherein the compartment is fabricated from a polymer matrix composite comprising a glass-filled polymer composite or a carbon-filled polymer composite.

7. A vehicular storage box, comprising:
   a compartment for holding articles, the compartment comprising four sides, a bottom and a top lid, wherein the compartment is fabricated from an engineered plastic or a polymer matrix composite;
   a locking assembly situated within the top lid; and
   a wireless interface,
   wherein the locking assembly comprises a central locking wheel connected to a linkage, a plurality of pawls for each of at least three of the sides of the compartment, and a solenoid switch,
   wherein the central locking wheel is movably connected to the plurality of pawls,
   wherein the solenoid switch is connected to the linkage to move the central locking wheel to drive the plurality of pawls into and out of the at least three of the sides of the compartment into a respective locked position of the top lid and an unlocked position of the top lid, and further wherein the wireless interface is configured to receive a wireless input and activate the solenoid switch based on the wireless input.

8. The storage box according to claim 7, further comprising:
a plurality of sliders, each slider connected to a set of the plurality of pawls corresponding to each of the at least three sides of the compartment,
wherein the locking wheel comprises a plurality of kidney-shaped tracks, each track receiving one of the sliders.

9. The storage box according to claim 7, wherein each pawl is engaged to a depth of at least 5 mm in one of the at least three of the sides of the compartment in the locked position of the lid.

10. The storage box according to claim 7, wherein the plurality of pawls have a pawl spacing of no more than 5 cm.

11. The storage box according to claim 7, wherein the linkage further comprises a spring to bias the wheel and the plurality of pawls in the locked position of the lid and the unlocked position of the lid.

12. The storage box according to claim 7, wherein the compartment is fabricated from a polymer matrix composite comprising a glass-filled polymer composite or a carbon-filled polymer composite.

13. The storage box according to claim 7, wherein the wireless input is based at least in part on an entry in a sensing interface of a personal identification number (PIN), a haptic security input, or another security code.

14. A vehicular storage box, comprising:
a compartment for holding articles, the compartment comprising four sides, a bottom and a top lid, wherein the compartment is fabricated from an engineered plastic or a polymer matrix composite;
a locking assembly situated within the top lid; and
a mechanical interface,
wherein the locking assembly comprises a central locking wheel connected to a linkage, a plurality of pawls for each of at least three of the sides of the compartment, and a solenoid switch,
wherein the central locking wheel is movably connected to the plurality of pawls,
wherein the solenoid switch is connected to the linkage to move the central locking wheel to drive the plurality of pawls into and out of the at least three of the sides of the compartment into a respective locked position of the top lid and an unlocked position of the top lid, and
further wherein the mechanical interface is configured to receive a mechanical input and activate the solenoid switch based on the mechanical input.

15. The storage box according to claim 14, further comprising:
a plurality of sliders, each slider connected to a set of the plurality of pawls corresponding to each of the at least three sides of the compartment,
wherein the locking wheel comprises a plurality of kidney-shaped tracks, each track receiving one of the sliders.

16. The storage box according to claim 14, wherein each pawl is engaged to a depth of at least 5 mm in one of the at least three of the sides of the compartment in the locked position of the lid.

17. The storage box according to claim 14, wherein the plurality of pawls has a pawl spacing of no more than 5 cm.

18. The storage box according to claim 14, wherein the linkage further comprises a spring to bias the wheel and the plurality of pawls in the locked position of the lid and the unlocked position of the lid.

19. The storage box according to claim 14, wherein the compartment is fabricated from a polymer matrix composite comprising a glass-filled polymer composite or a carbon-filled polymer composite.

20. The storage box according to claim 14, wherein the mechanical input is based at least in part on movement of a key in a lock, movement of tumblers in a lock, or a haptic communication with a sensing interface.

* * * * *